Figure 2:
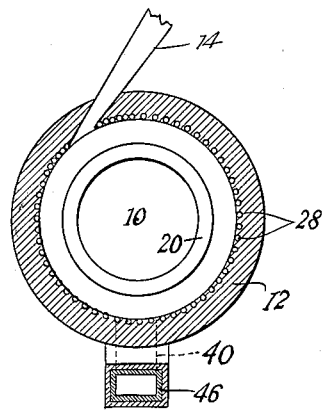

Sept. 13, 1955 A. SIFRIN 2,717,563
HORIZONTAL CYCLONE FURNACE
Filed Dec. 27, 1950

INVENTOR
*Andreas Sifrin*
BY
*J. P. Moran*
ATTORNEY

2,717,563
HORIZONTAL CYCLONE FURNACE

Andreas Sifrin, Oberhausen, Rhineland, Germany, assignor to The Babcock & Wilcox Company, Rockleigh, N. J., a corporation of New Jersey Application December 27, 1950, Serial No. 202,981

Claims priority, application Germany January 16, 1950

6 Claims. (Cl. 110—28)

The present invention relates to the construction and operation of cyclone furnaces for burning ash-containing solid fuels in a relatively coarsely pulverized or "granular" condition at furnace chamber temperatures above the ash fusion temperature to thereby permit the removal of the incombustible ash residue from the furnace chamber as a liquid slag, and more particularly to furnaces of the character described in which the gaseous products of combustion are discharged from the furnace chamber adjacent the point of entry of the combustible mixture of fuel and air.

The "granular" fuels normally used in such furnaces have particle sizes of ⅜" and under, and contain as a result of the fuel crushing operation a proportion of dust-like particles, known as "fines." The fuel and air mixture is introduced in the combustion chamber through a tangential inlet arranged to effect a whirling motion of the fuel and air mixture in a helical path axially of and toward the opposite end of the furnace. In operation the entering fuel and air stream is rapidly ignited and the centrifugal effect of the whirling stream causes the ash particles released from the burning fuel particles to deposit in a molten condition on the furnace wall and form a film or layer of molten slag thereon on which the larger fuel particles are caught and burned.

In the operation of such furnaces there is a tendency for the finer fuel particles to separate from the main fuel and air stream and be carried out in an unburned condition with the furnace gases or to be carried away by the slag, resulting in a loss of unburned combustibles. This would be particularly likely to occur in a cyclone furnace arranged about a vertical axis, and having both its fuel and air inlet and heating gas outlet at the upper end thereof and a slag outlet at the lower end thereof. With such an arrangement any fuel particles falling or drawn out of the whirling stream of fuel and air are liable to be carried away in an unburned condition through the slag outlet in the bottom of the furnace chamber.

In accordance with the present invention such losses of unburned combustibles are avoided or minimized in cyclone furnaces of the general character described by arranging the furnace chamber about a substantially horizontal axis, the provision of an elongated frusto-conical extension of the furnace chamber at the end thereof opposite the gas outlet, and the introduction of a regulable supply of secondary combustion air into the furnace chamber at that end to aid in returning the separated fine particles to the main combustion zone. To avoid undesirable cooling of the slag on the furnace chamber walls and flowing to the slag discharge opening, the secondary combustion air is advantageously preheated by the admixture of heating gases recirculated from the furnace chamber.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 1:
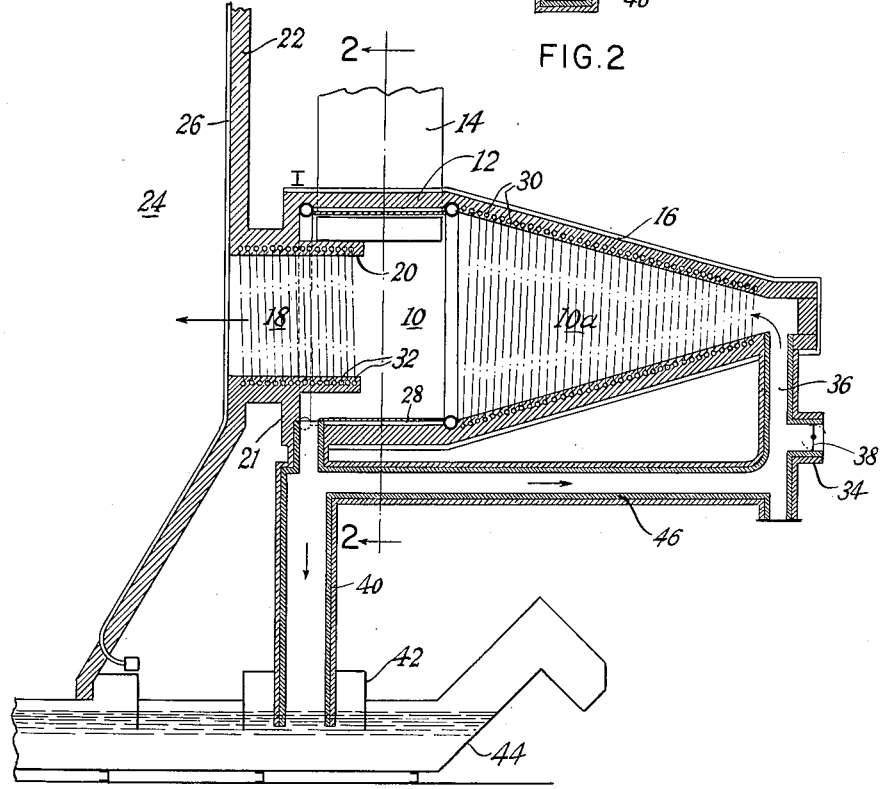

On the drawings:

Fig. 1 is a somewhat diagrammatic sectional elevation of a horizontally arranged cyclone furnace constructed in accordance with my invention, and the adjacent portion of a secondary combustion chamber in an associated water tube steam boiler; and Fig. 2 is a vertical section taken on the line 2—2 of Fig. 1.

As shown in the drawings, the combustion chamber of the cyclone furnace illustrated has a substantially cylindrical portion 10 defined by a circular wall 12 arranged with its axis approximately horizontal and having one or more tangentially arranged nozzles 14 for supplying a combustible mixture of granular fuel and primary combustion air thereto. The combustion chamber also includes a rearwardly tapering frusto-conical section $10^a$ formed by a correspondingly shaped circular wall 16 extending rearwardly from the wall 12. At the front end of the combustion chamber is arranged a concentric gas outlet 18, defined by a throat member 20 extending normal to and through the combustion chamber front wall 21 and terminating at its front end in a vertical wall 22 of a secondary combustion chamber 24 of an associated steam boiler. The secondary combustion chamber wall 22 is covered with water tubes 26 which are bent around the discharge end of the throat member 20, to permit the discharge of gases from the cyclone furnace therebetween. The walls 12, 16 and 20 of the combustion chamber and gas outlet are lined with refractory covered water tubes 28, 30 and 32 respectively, which are connected in any suitable manner into the fluid circulation system of the associated steam boiler.

At the rear end of the combustion chamber section $10^a$ is connected a conduit 36 opening to the chamber at one end thereof. A regulable flow of secondary combustion air is supplied to the conduit 36 through an air inlet 34 controlled by a regulating damper 38. When the secondary combustion chamber 24 is under a subatmospheric pressure, an air flow can be induced through the inlet 34 from the surrounding atmosphere. When the chamber 24 is under a superatmospheric pressure, the air inlet 34 must be connected to a source of air under a suitable superatmospheric pressure. A stream of air thus tends to flow axially of the combustion chamber, as indicated by the arrows in Fig. 1.

The molten slag is discharged from the combustion chamber section 10 through a slag discharge pipe 40 opening thereto below the throat member 20 and alongside the front wall 21. The cyclone furnace may be slightly inclined, if desired, so that the slag outlet will be at the lowermost point in the combustion chamber. The lower end of the slag outlet pipe 40 projects within and makes an air tight joint with a housing 42 of bell-like form, the vertical walls of which dip into a water pool maintained within a slag-receiving trough 44, whereby the slag outlet pipe is sealed against the surrounding atmosphere and the combustion chamber may be maintained under the desired pressure.

In operation, the combustible mixture of primary air and granular fuel enters the combustion chamber section 10 and burns therein in a whirling stream flowing in a helical path rearwardly thereof. The greater portion of the incombustible ash residue from the burning fuel is deposited on the combustion chamber walls in a molten condition to form a film or layer thereon, and the excess slag flows downwardly thereon and through the slag outlet pipe 40 into the trough 44. Due to the arrangement of the gas outlet throat 20 and the flow restrictive effect of the rearwardly tapering combustion chamber section 10ª, the stream of gaseous products of combustion tends to turn inwardly towards the axis of the combustion chamber. The stream of secondary combustion air from the conduit 36 rapidly mixes with the gaseous products of combustion in the rear part of the combustion chamber and aids in the completion of combustion of the remaining fuel particles. The axial flow of air and gases forwardly through the section 10ª of the combustion chamber tends to prevent the fuel fines still in suspension from dropping into the slag layer. The gaseous products of combustion flow forwardly through the gas outlet throat 20 into the secondary combustion chamber 24.

A recirculating gas conduit 46 is arranged alongside the furnace chamber with its forward end opening into the flow path of the gaseous products of combustion at a point of high temperature, such as the annular combustion chamber space around the throat member 20, preferably by connecting the conduit 36 to the upper portion of the slag discharge pipe 40, and its rear end connected to the secondary air conduit 36. With this arrangement high temperature gases are drawn from the front end of the combustion chamber through the duct 46 and mixed with the air in the conduit 36. The recirculated gases serve to preheat the secondary air stream sufficiently to avoid undesirable cooling of the molten slag on the rearwardly tapering walls of the combustion chamber section 10ª and supplement the fuel fines flotation effect of the secondary air stream. The recirculation of high temperature gases to the rear end of the combustion chamber raises the chamber temperature substantially, particularly when the damper 38 is closed to permit a maximum gas recirculation. The passage of hot gases through the slag outlet aids in maintaining the slag outlet clear of slag accumulations.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Apparatus for burning a slag-forming fuel which comprises means forming a substantially cylindrical furnace chamber arranged with its axis substantially horizontal and having a gas outlet adajcent one end thereof, means for introducing a combustible mixture of air and slag-forming fuel in suspension tangentially into a cylindrical portion of said furnace chamber, means forming an elongated conical extension of said furance chamber at the end thereof opposite said gas outlet, liquid heating tubes arranged to cool the walls of said furnace chamber and conical extension, a molten slag outlet opening to the cylindrical portion of said furnace chamber, and means for recirculating gases from the gas outlet end of said furnace chamber to the smaller end portion of said furnace chamber extension.

2. Apparatus for burning a slag-forming solid fuel which comprises means forming a substantially cylindrical furnace chamber ararnged with its axis substantially horizontal and having a gas outlet at one end thereof, means for introducing a combustible mixture of air and slag-forming solid fuel in suspension tangentially into a cylindrical portion of said furnace chamber adjacent said gas outlet, means forming an elongated extension of said furnace chamber at the end thereof opposite said gas outlet, a molten slag outlet opening to the cylindrical portion of said furnace chamber, and means for withdrawing gaseous products of combustion through said slag outlet and introducing the withdrawn gaseous products of combustion into said furnace chamber extension.

3. Apparatus for burning a slag-forming granular fuel which comprises means forming a substantially cylindrical furnace chamber arranged with its axis substantially horizontal and having a gas outlet throat projecting into one end thereof, means for introducing a combustible mixture of air and granular fuel in suspension tangentially into said furnace chamber around said gas outlet throat, means forming an elongated conical extension of said furnace chamber at the end thereof opposite said gas outlet throat, liquid heating tubes arranged to cool the walls of said furnace chamber and conical extension, a molten slag outlet opening to the cylindrical portion of said furnace chamber adjacent its gas outlet end, means for sealing the discharge end of said slag outlet from the surrounding atmosphere, a secondary combustion air inlet opening into the smaller end portion of said furnace chamber extension, and means for mixing recirculated gases from the gas outlet end of said furnace chamber with said secondary combustion air prior to its entry into said furnace chamber extension.

4. Apparatus for burning a slag-forming granular fuel having coarse and fine fuel particles which comprises means forming a substantially cylindrical furnace chamber arranged with its axis substantially horizontal and having a gas outlet adjacent one end thereof, means for introducing a combustible mixture of air and granular fuel in suspension tangentially into the cylindrical portion of said furnace chamber in a manner tending to cause fine fuel particles to separate therefrom and burning the fuel introduced at a normal mean temperature above the fuel ash fusion temperature, means forming an elongated conical extension of said furnace chamber at the end thereof opposite said gas outlet, liquid heating tubes arranged to cool the walls of said furnace chamber and conical extension and proportioned to maintain a layer of molten slag thereon, a molten slag outlet opening to the cylindrical portion of said furnace chamber, and a secondary combustion air inlet opening into the smallest end portion of said furnace chamber extension and arranged to provide an axial flow of air for the support and combustion of the separated fine fuel particles.

5. Apparatus for burning a slag-forming granular fuel having coarse and fine fuel particles which comprises means forming a substantially cylindrical furnace chamber arranged with its axis substantially horizontal and having a gas outlet throat projecting into one end thereof, means for introducing a combustible mixture of air and granular fuel in suspension tangentially into the cylindrical portion of said furnace chamber around said gas outlet throat in a manner tending to cause fine fuel particles to separate therefrom and burning the fuel introduced at a normal mean temperature above the fuel ash fusion temperature, means forming an elongated conical extension of said furnace chamber at the end thereof opposite said gas outlet throat, liquid heating tubes arranged to cool the walls of said furnace chamber and conical extension and proportioned to maintain a layer of molten slag thereon, a molten slag outlet opening to the cylindrical portion of said furnace chamber adjacent its gas outlet end, and a secondary combustion air inlet opening into the smallest end portion of said furnace chamber extension and arranged to provide an axial flow of air for the support and combustion of the separated fine fuel particles.

6. Apparatus for burning a slag-forming granular fuel having coarse and fine fuel particles which comprises means forming a substantially cylindrical furnace chamber arranged with its axis substantially horizontal and having a gas outlet throat projecting into one end thereof, means for introducing a combustible mixture of air and granular fuel in suspension tangentially into the cylindrical portion of said furnace chamber around said gas outlet throat in a manner tending to cause fine fuel particles to separate therefrom and burning the fuel introduced at a normal mean temperature above the fuel ash fusion temperature, means forming an elongated conical extension of said furnace chamber at the end thereof opposite said gas outlet throat, liquid heating tubes arranged to cool the walls of said furnace chamber and conical extension and proportioned to maintain a layer of molten slag thereon, a molten slag outlet opening to the cylindrical portion of said furnace chamber adjacent its gas outlet end, means for sealing the discharge end of said slag outlet from the surrounding atmosphere, and a secondary combustion air inlet opening into the smallest end portion of said furnace chamber extension and arranged to provide an axial flow of air for the support and combustion of the separated fine fuel particles.

References Cited in the file of this patent

UNITED STATES PATENTS

| Number | Name | Date |
|---|---|---|
| 812,193 | Eldred | Feb. 13, 1906 |
| 1,180,792 | Norrman | Apr. 25, 1916 |
| 1,532,041 | Couch | Mar. 31, 1925 |
| 1,713,817 | Cotton | May 21, 1929 |
| 1,831,466 | Schmidt | Nov. 10, 1931 |
| 1,852,968 | Hillhouse | Apr. 5, 1932 |
| 1,926,637 | Suffern | Sept. 12, 1933 |
| 2,357,301 | Bailey et al. | Sept. 5, 1944 |
| 2,516,141 | Newman et al. | July 25, 1950 |
| 2,527,934 | Jefferies | Oct. 31, 1950 |

FOREIGN PATENTS

| Number | Country | Date |
|---|---|---|
| 302,255 | Great Britain | Dec. 11, 1928 |
| 305,270 | Great Britain | Feb. 1, 1929 |
| 847,570 | France | July 3, 1939 |